(12) United States Patent
Xie et al.

(10) Patent No.: US 11,100,341 B2
(45) Date of Patent: Aug. 24, 2021

(54) LANE LINE TRACKING METHOD AND DEVICE

(71) Applicant: Baidu Online Network Technology (Beijing) Co., Ltd., Beijing (CN)

(72) Inventors: Shufu Xie, Beijing (CN); Yuqiang Zhai, Beijing (CN); Tian Xia, Beijing (CN); Yu Ma, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 62 days.

(21) Appl. No.: 16/509,112

(22) Filed: Jul. 11, 2019

(65) Prior Publication Data
US 2020/0074188 A1    Mar. 5, 2020

(30) Foreign Application Priority Data

Sep. 4, 2018    (CN) .......................... 20181102606.X (51) Int. Cl.
*G06K 9/00* (2006.01)
*G06K 9/44* (2006.01)
*G08G 1/16* (2006.01)

(52) U.S. Cl.
CPC ........... *G06K 9/00798* (2013.01); *G06K 9/44* (2013.01); *G08G 1/167* (2013.01); *G06K 9/00791* (2013.01); *G06T 2207/30256* (2013.01)

(58) Field of Classification Search
CPC .. G06K 9/00798; G06K 9/44; G06K 9/00791; G06T 2207/30256
See application file for complete search history.

(56) References Cited

U.S. PATENT DOCUMENTS

2013/0028473 A1* 1/2013 Hilldore ............. G06K 9/00798
                                                          382/103
2014/0002656 A1    1/2014 Woo
(Continued)

FOREIGN PATENT DOCUMENTS

CN    104574311 A    4/2015
CN    106447730 A    2/2017
(Continued)

OTHER PUBLICATIONS

Jung Soonhong, et al.,"Efficient Lane Detection Based on Spatiotemporal Images", IEEE Transactions on Intelligent Transportation Systems, IEEE, Piscataway, NJ, USA, vol. 17, No. 1, Jan. 1, 2016, pp. 289-295, XP011595322.
(Continued)

*Primary Examiner* — Kenny A Cese
(74) *Attorney, Agent, or Firm* — Knobbe, Martens, Olson & Bear, LLP (57) ABSTRACT

A lane line tracking method and device are provided. The method can include: projecting a lane line detection result of previous K frames preceding a current frame in a camera coordinate system to a world coordinate system, to obtain a first projection result, wherein K is a positive integer greater than or equal to 1, and the previous K frames are consecutive K frames preceding the current frame; projecting the first projection result of the previous K frames in the world coordinate system to a camera coordinate system of the current frame, to obtain a second projection result; and determining, in the camera coordinate system of the current frame, lane line groups of the current frame, according to lane line groups in the second projection result of the previous K frames.

17 Claims, 7 Drawing Sheets

(56) References Cited

U.S. PATENT DOCUMENTS

| | | | |
|---|---|---|---|
| 2016/0196654 A1* | 7/2016 | Aoki | G06T 7/246 |
| | | | 382/103 |
| 2018/0188026 A1* | 7/2018 | Zhang | G01S 19/42 |
| 2018/0188060 A1 | 7/2018 | Wheeler | |

FOREIGN PATENT DOCUMENTS

| | | |
|---|---|---|
| CN | 107045629 A | 8/2017 |
| CN | 107729814 A | 2/2018 |
| JP | 2014-160322 A | 9/2014 |
| JP | 2017-156795 A | 9/2017 |
| JP | 2018-25906 A | 2/2018 |
| JP | 2018-112989 A | 7/2018 |
| JP | 2018-116147 A | 7/2018 |

OTHER PUBLICATIONS

Aharon Bar Hillel et al., "Recent progress in road and lane detection: a survey", Machine Vision and Applications, vol. 25, No. 3, Apr. 1, 2014, pp. 727-745, XP055571476.
Extended Search Report dated Jan. 13, 2020 for Application No. 19185305.0, 10 pages.
First Office Action in Chinese Application No. 201811026061.X in 17 pages (dated May 24, 2019).
Search Report in Chinese Application No. 201811026061.X in 4 pages (dated May 15, 2019).
Japanese Office Action dated Aug. 24, 2020 for Application No. 2019-127325 in 9 pgs.

\* cited by examiner

LANE LINE TRACKING METHOD AND DEVICE

CROSS-REFERENCE TO RELATED APPLICATION

This application claims priority to Chinese Patent Application No. 201811026061.X, filed on Sep. 4, 2018, which is hereby incorporated by reference in its entirety.

FIELD OF THE DISCLOSURE

The present disclosure relates to a technical field of traffics, and in particular, to a lane line tracking method and a lane line tracking device.

BACKGROUND OF THE DISCLOSURE

Lane lines play an important role in automatic driving, and can provide important information to be output to modules, such as positioning module, decision module and control module.

During the running of a vehicle, there is a correlation between an image in a preceding frame and an image in a succeeding frame in a captured video of lane lines. When a problem occurs in a certain frame image, detection results for a single frame are prone to a sudden change, thus causing such as a lane line loss or the like. Therefore, lane line results obtained by a single frame detection is extremely inaccurate.

SUMMARY OF THE DISCLOSURE

According to embodiments of the present disclosure, a lane line tracking method and a lane line tracking device are provided to solve one or more technical problems in the conventional technologies.

In a first aspect, according to an embodiment of the present disclosure, it is provided a lane line tracking method, including:

projecting a lane line detection result of previous K frames preceding a current frame in a camera coordinate system to a world coordinate system, to obtain a first projection result, wherein K is a positive integer greater than or equal to 1, and the previous K frames are consecutive K frames preceding the current frame;

projecting the first projection result of the previous K frames in the world coordinate system to a camera coordinate system of the current frame, to obtain a second projection result; and determining, in the camera coordinate system of the current frame, lane line groups of the current frame according to lane line groups in the second projection result of the previous K frames.

In combination with the first aspect, according to an embodiment of the present disclosure, in a first implementation of the first aspect, the determining, in the camera coordinate system of the current frame, lane line groups of the current frame, according to lane line groups in the second projection result of the previous K frames includes:

selecting a lane line group from the current frame, and calculating minimum distances between the selected lane line group of the current frame and respective lane line groups in the second projection result of the previous K frames; and merging the selected lane line group of the current frame into the S-th lane line group in the second projection result of the previous K frames, if a minimum distance between the selected lane line group and the S-th lane line group in the second projection result of the previous K frames has a minimum of the minimum distances, wherein S is a positive integer greater than or equal to 1.

In combination with the first implementation of the first aspect, according to an embodiment of the present disclosure, in a second implementation of the first aspect, the merging the selected lane line group of the current frame into the S-th lane line group in the second projection result of the previous K frames includes:

merging the selected lane line group of the current frame into the S-th lane line group in the second projection result of the previous K frames, if the minimum of the minimum distances is less than a preset threshold; and establishing a new group based on the selected lane line group of the current frame, if the minimum of the minimum distances is greater than or equal to the preset threshold.

In combination with the first aspect, according to an embodiment of the present disclosure, in a third implementation of the first aspect, it is further included:

performing, in the camera coordinate system of the current frame, a smoothing-process on lane line points of the lane line groups of the current frame, according to lane line points of the lane line groups in the second projection result of the previous K frames.

In combination with the third implementation of the first aspect, according to an embodiment of the present disclosure, in a fourth implementation of the first aspect, the performing a smoothing-process on lane line points of the lane line groups of the current frame, according to lane line points of the lane line groups of the second projection result of the previous K frames includes:

filtering out a lane line point of the P-th lane line group of the current frame, if a distance between the lane line point of the P-th lane line group of the current frame and the P-th lane line group of the preceding frame are greater than a threshold, wherein P is a positive integer greater than or equal to 1.

In combination with the first aspect, according to an embodiment of the present disclosure, in a fifth implementation of the first aspect, it is further included:

complementing the current frame by using lane line points of the lane line groups in the second projection result of the previous K frames.

In combination with the fifth implementation of the first aspect, according to the embodiment of the present disclosure, in a sixth implementation of the first aspect, the complementing the current frame by using lane line points of the lane line groups in the second projection result of the previous K frames includes:

adding, in the current frame, lane line points of the M-th lane line group of the current frame by using lane line points of the M-th lane line group in the second projection result of the previous K frames, if the second projection result of the previous K frames includes the M-th lane line group and the current frame does not include a group corresponding to the M-th lane line group, wherein M is a positive integer greater than or equal to 1.

In combination with the first aspect or any one of the implementations thereof, according to an embodiment of the present disclosure, in a seventh implementation of the first aspect, it is further included:

deleting the N-th lane line group in the second projection result of the previous K frames, if the second projection result of the previous K frames includes the N-th lane line group and consecutive T frames succeeding the current frame does not include a group corresponding to the N-th lane line group, wherein T is a positive integer greater than 1, and N is a positive integer greater than or equal to 1.

In a second aspect, according to an embodiment of the present disclosure, it is provided a lane line tracking device, including:

a first projection module, configured to project a lane line detection result of previous K frames preceding a current frame in a camera coordinate system to a world coordinate system, to obtain a first projection result, wherein K is a positive integer greater than or equal to 1, and the previous K frames are consecutive K frames preceding the current frame;

a second projection module, configured to project the first projection result of the previous K frames in the world coordinate system to a camera coordinate system of the current frame, to obtain a second projection result; and a grouping module, configured to determine, in the camera coordinate system of the current frame, lane line groups of the current frame according to lane line groups in the second projection result of the previous K frames.

In combination with the second aspect, according to an embodiment of the present disclosure, in a first implementation of the second aspect, the grouping module includes:

a distance sub-module, configured to select a lane line group from the current frame, and calculate minimum distances between the selected lane line group of the current frame and respective lane line groups in the second projection result of the previous K frames; and a merging sub-module, configured to merge the selected lane line group of the current frame into the S-th lane line group in the second projection result of the previous K frames, if a minimum distance between the selected lane line group and the S-th lane line group in the second projection result of the previous K frames has a minimum of the minimum distances, wherein S is a positive integer greater than or equal to 1.

In combination with the first implementation of the second aspect, according to an embodiment of the present disclosure, in a second implementation of the second aspect, the merging sub-module is further configured to merge the selected lane line group of the current frame into the S-th lane line group in the second projection result of the previous K frames, if the minimum of the minimum distances is less than a preset threshold.

The grouping module further includes a creation sub-module configured to establish a new group based on the selected lane line group of the current frame, if the minimum of the minimum distances is greater than or equal to the preset threshold.

In combination with the second aspect, according to an embodiment of the present disclosure, in a third implementation of the second aspect, it is further included:

a smoothing module, configured to perform, in the camera coordinate system of the current frame, a smoothing-process on lane line points of the lane line groups of the current frame, according to lane line points of the lane line groups in the second projection result of the previous K frames.

In combination with the third implementation of the second aspect, according to an embodiment of the present disclosure, in a fourth implementation of the second aspect, the smoothing module is further configured to filter out a lane line point of the P-th lane line group of the current frame, if a distance between the lane line point of the P-th lane line group of the current frame and the P-th lane line group of the preceding frame are greater than a threshold, wherein P is a positive integer greater than or equal to 1.

In combination with the second aspect, according to an embodiment of the present disclosure, in a fifth implementation of the second aspect, it is further included:

a complementation module, configured to complement the current frame by using the lane line points of the lane line groups in the second projection result of the previous K frames.

In combination with the fifth implementation of the second aspect, according to the embodiment of the present disclosure, in a sixth implementation of the second aspect, the complementation module is further configured to add, in the current frame, lane line points of the M-th lane line group of the current frame by using lane line points of the M-th lane line group in the second projection result of the previous K frames, if the second projection result of the previous K frames includes the M-th lane line group and the current frame does not include a group corresponding to the M-th lane line group, wherein M is a positive integer greater than or equal to 1.

In combination with the second aspect or any one of the implementations thereof, according to an embodiment of the present disclosure, in a seventh implementation of the second aspect, it is further included:

a deletion module, configured to delete the N-th lane line group in the second projection result of the previous K frames, if the second projection result of the previous K frames includes the N-th lane line group and consecutive T frames succeeding the current frame does not include a group corresponding to the N-th lane line group, wherein T is a positive integer greater than 1, and N is a positive integer greater than or equal to 1.

In a third aspect, according to an embodiment of the present disclosure, it is provided a lane line tracking device, the functions of which may be implemented by using hardware or corresponding software executed by hardware. The hardware or software includes one or more modules corresponding to the functions described above.

In a possible design, the device includes a processor and a memory for storing a program which supports the device in executing the lane line tracking method described above, and the processor is configured to execute the program stored in the memory. The device can further include a communication interface for communicating with other devices or communication networks.

In a fourth aspect, according to an embodiment of the present disclosure, it is provided a non-volatile computer readable storage medium for storing computer software instructions used for a lane line tracking device, the computer readable storage medium including a program involved in executing the lane line tracking method described above.

One of the above technical solutions has the following advantages or advantageous effects: it is possible to output more accurate and more robust lane line result by using the correlation between preceding and succeeding frames, thereby achieving an accurate lane line tracking effect.

Another one of the above technical solutions has the following advantages or advantageous effects: The use of the correlation between preceding and succeeding frames is conductive to the improvement of the smoothness of lane line detection results.

The above summary is provided only for illustration, and is not intended to limit the present disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION OF THE EMBODIMENT(S) OF THE DISCLOSURE

Hereinafter, only some exemplary embodiments are simply described. As can be appreciated by those skilled in the art, the described embodiments may be modified in various different ways without departing from the spirit or scope of the present disclosure. Accordingly, the drawings and the description should be considered as illustrative in nature instead of being restrictive.

Figure 1:
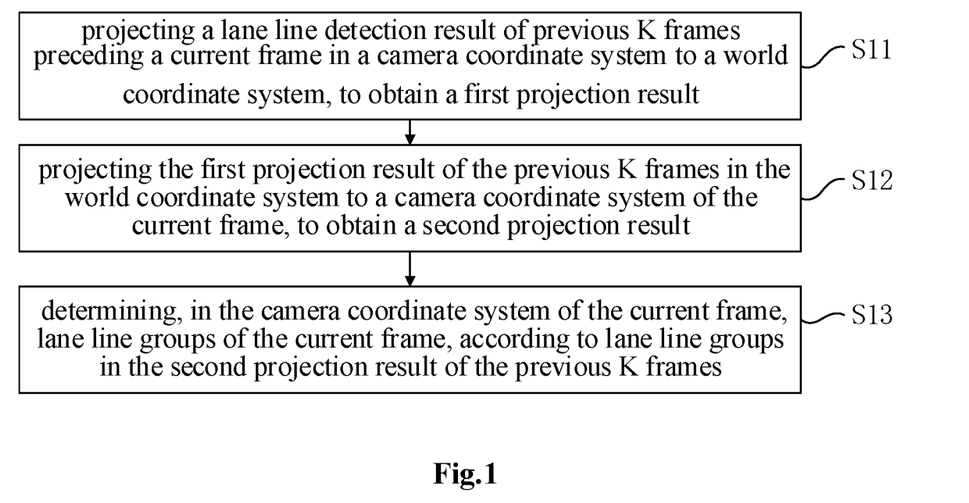
FIG. 1 shows a flowchart of a lane line tracking method according to an embodiment of the present disclosure.

FIG. 1 shows a flowchart of a lane line tracking method according to an embodiment of the present disclosure. As shown in FIG. 1, the method may include:

step S11: projecting a lane line detection result of previous K frames preceding a current frame in a camera coordinate system to a world coordinate system, to obtain a first projection result, wherein K is a positive integer greater than or equal to 1, and the previous K frames are consecutive K frames preceding the current frame.

Figure 2:
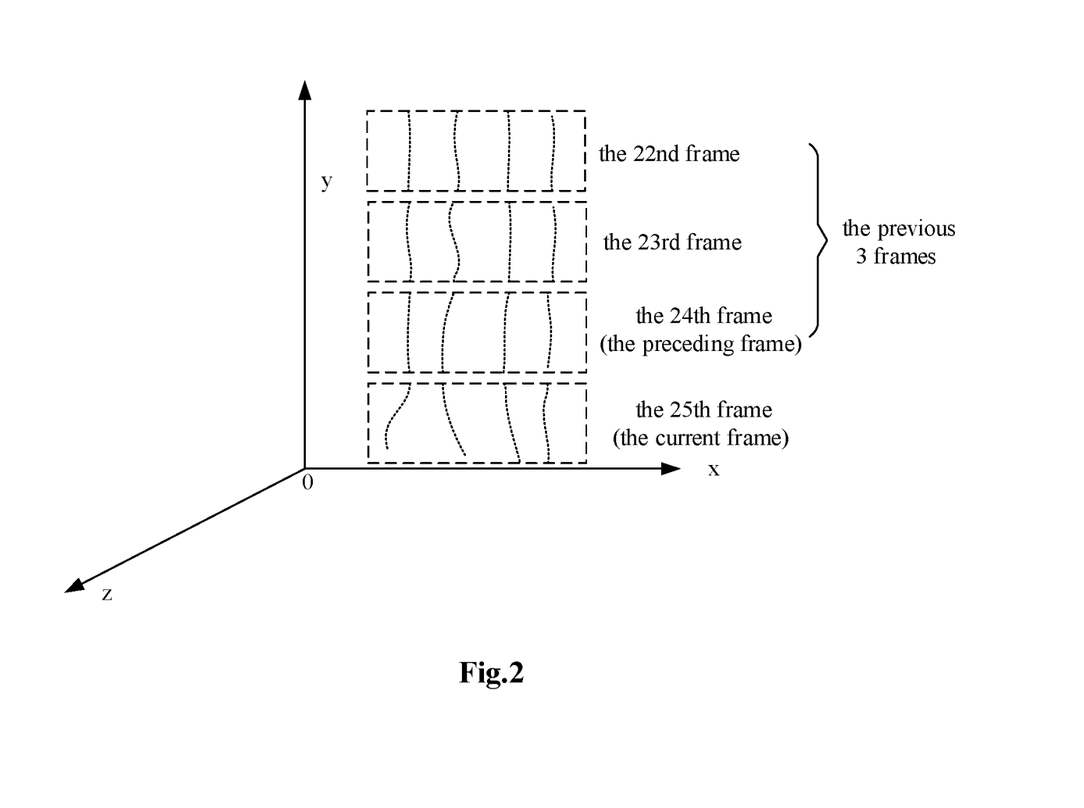
FIG. 2 is a schematic diagram illustrating a camera coordinate system of the current frame in a lane line tracking method according to an embodiment of the present disclosure.

In the present embodiment, during the running of the vehicle, a video containing lane lines can be captured. The video includes several consecutive frame images. For a certain moment, the frame image of the current moment may be referred to as a current frame. The previous K frames preceding the current frame may include consecutive K frame images preceding the current frame image. For example, as shown in FIG. 2, if the current frame is the 25th frame and K=3, the previous 3 frames preceding the current frame include the 22nd frame, the 23rd frame and the 24th frame.

A lane line detection result of each frame image in a camera coordinate system may include lane line points, wherein the lane line points are derived by determining which pixel points in the frame image belong to a lane line. A lane line detection result may also include groups of these lane line points, wherein the groups of the lane line points are derived by determining which lane line points belong to a group, and wherein the groups of the lane line points may be referred to as lane line groups.

A camera coordinate system refers to a screen viewable area defined at the camera and positioned in the 3D (three dimensional) space. For example, as shown in FIG. 2, in the camera coordinate system, the position of a camera is at the origin, the x-axis faces rightward, the z-axis faces forward (in a direction toward the screen or the camera), and the y-axis faces upward (not on top of the world, but on top of the camera itself). A world coordinate system is an absolute coordinate system of a system. There is a certain posture conversion relationship between the camera coordinate system of each frame and the world coordinate system. The posture conversion relationships between the camera coordinate systems of different frames and the world coordinate system may be different, depending in particular on camera parameters when each frame is captured, such as focus position, focal length, pitch angle, roll angle, etc.

In the present embodiment, a lane line detection can be performed on each frame to obtain a lane line detection result of this frame in the camera coordinate system. The lane line detection result of each frame can be projected into a world coordinate system according to the posture conversion relationship between the camera coordinate system of this frame and the world coordinate system.

Step S12: projecting the first projection result of the previous K frames in the world coordinate system to a camera coordinate system of the current frame, to obtain a second projection result.

A lane line detection is performed on the current frame to obtain a lane line detection result of the current frame in the camera coordinate system. By using the world coordinate system as an intermediate conversion medium, pixel points of the previous K frames can be aligned with pixel points of the current frame in the camera coordinate system of the current frame. As shown in FIG. 2, the 22nd frame, the 23rd frame and the 24th frame are aligned with the 25th frame in the camera coordinate system of the 25th frame.

Step S13: determining, in the camera coordinate system of the current frame, lane line groups of the current frame, according to lane line groups in the second projection result of the previous K frames.

For example, the lane line groups of the previous K frames are compared with the lane line groups of the current frame, in order to determine whether a match between the lane line groups in terms of number, position, distance, and the like is achieved. If a match is achieved, the lane line groups of the current frame can be adjusted so that the lane line groups of the current frame are consecutive with the lane line groups of the previous K frames, thereby implementing a lane line tracking.

Figure 3:
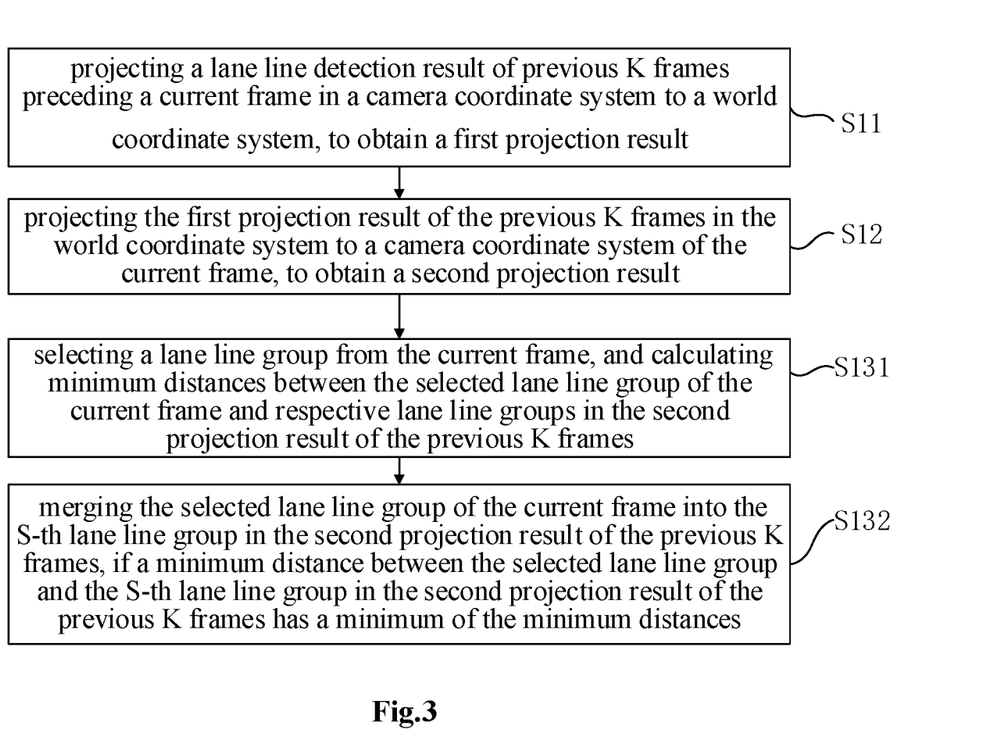
FIG. 3 shows a flowchart of a lane line tracking method according to an embodiment of the present disclosure.

In an implementation, as shown in FIG. 3, step S13 includes:

step S131: selecting a lane line group from the current frame, and calculating minimum distances between the selected lane line group of the current frame and respective lane line groups in the second projection result of the previous K frames; and step S132: merging the selected lane line group of the current frame into the S-th lane line group in the second projection result of the previous K frames, if a minimum distance between the selected lane line group and the S-th lane line group in the second projection result of the previous K frames has a minimum of the minimum distances, wherein S is a positive integer greater than or equal to 1.

In an example, a lane line group is selected from the lane line groups of the current frame, which is assumed as the D-th group. The distances from each lane line point (e.g., D1, D2) in the D-th group and individual lane line points (e.g., E1, E2 and E3) in a certain lane line group (assuming the E-th group) of the previous K frames are calculated. Then, a minimum of the distances (assuming the distance from D1 to E2 is the minimum one) is taken as the minimum distance between the two lane line groups (the D-th group of the current frame and the E-th group of the previous K frames).

Minimum distances between the D-th group of the current frame and the individual lane line groups of the previous K frames are calculated respectively. If the minimum distance between the E-th group of the current frame and the S-th group of the previous K frames is the smallest, the E-th group of the current frame may be merged into the S-th group.

In an implementation, step S132 includes: merging the selected lane line group of the current frame into the S-th lane line group in the second projection result of the previous K frames, if the minimum of the minimum distances is less than a preset threshold; and establishing a new group based on the selected lane line group of the current frame, if the minimum of the minimum distances is greater than or equal to the preset threshold.

If the minimum of the minimum distances between a group of the current frame and a group of the previous K frames is still relatively large, it can be inappropriate to merge the two groups into one. Therefore, a reasonable threshold can be set. If the minimum of the minimum distances between a group of the current frame and a group of the previous K frames is less than the threshold, it means that there is a strong correlation between the two groups and they can be combined. If the minimum of the minimum distances between a group of the current frame and a group of the previous K frames is greater than the threshold, it means that there is a weak correlation between the two groups and it is inappropriate to merge them. Then, a new group can be established. The threshold can be set in many ways, such as by taking vehicle speed, camera parameters and the like into consideration.

The two groups can be merged into one by modifying the group number of a certain lane line group of the current frame to be the same as that of the S-th group of the previous K frames.

Figure 4:
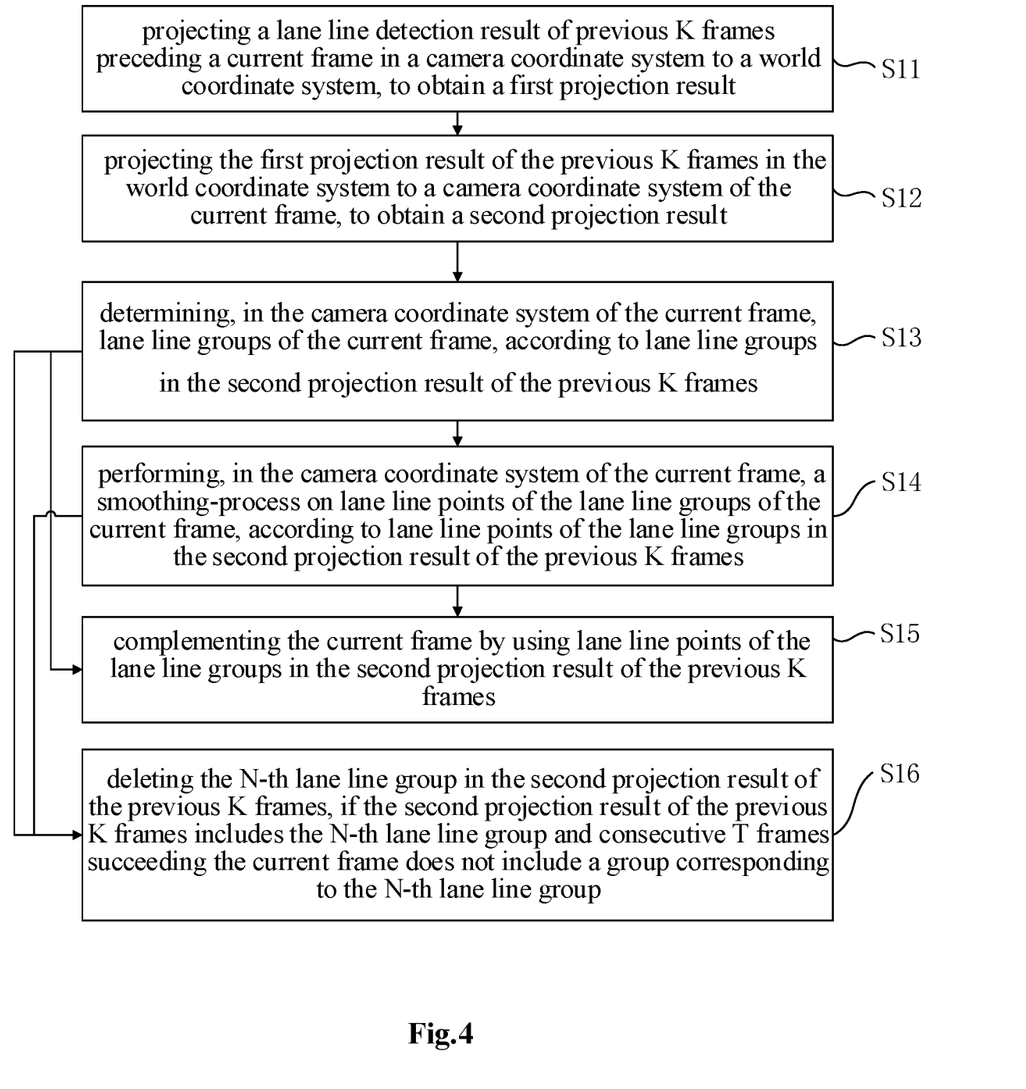
FIG. 4 shows a flowchart of a lane line tracking method according to an embodiment of the present disclosure.

In an implementation, as shown in FIG. 4, the method further includes:

Step S14: performing, in the camera coordinate system of the current frame, a smoothing-process on lane line points of the lane line groups of the current frame, according to lane line points of the lane line groups in the second projection result of the previous K frames.

In an implementation, in step S14, the performing a smoothing-process on the lane line points of the current frame, according to lane line points of the lane line groups in the second projection result of the previous K frames includes:

filtering out a lane line point of the P-th lane line group of the current frame, if a distance between the lane line points of the P-th lane line group of the current frame and the P-th lane line group of the preceding frame are greater than a set threshold, wherein P is a positive integer greater than or equal to 1.

For example, distances between a certain lane line point of the P-th group of the current frame and all lane line points of the P-th group of the preceding frame are calculated. The minimum of the distances is taken as the minimum distance between said certain lane line point of the current frame and the P-th group of the preceding frame. If the minimum exceeds a certain threshold, this lane line point of the current frame can be filtered out.

For another example, a distance between a certain lane line point of the P-th group of the current frame and a certain lane line point of the P-th group of the preceding frame can be calculated. If the distance exceeds a certain threshold, this lane line point of the current frame can be filtered out.

In an implementation, as shown in FIG. 4, the method further includes:

step S15: complementing the current frame by using lane line points of the lane line groups in the second projection result of the previous K frames. This step may be executed after step S13 or after step S14. The complementation is performed by using data smoothened after a smoothing-process.

In an implementation, step S15 includes: adding, in the current frame, lane line points of the M-th lane line group of the current frame by using lane line points of the M-th lane line group in the second projection result of the previous K frames (e.g., the preceding frame), if the second projection result of the previous K frames includes the M-th lane line group and the current frame does not include a group corresponding to the M-th lane line group, wherein M is a positive integer greater than or equal to 1.

Figure 5:
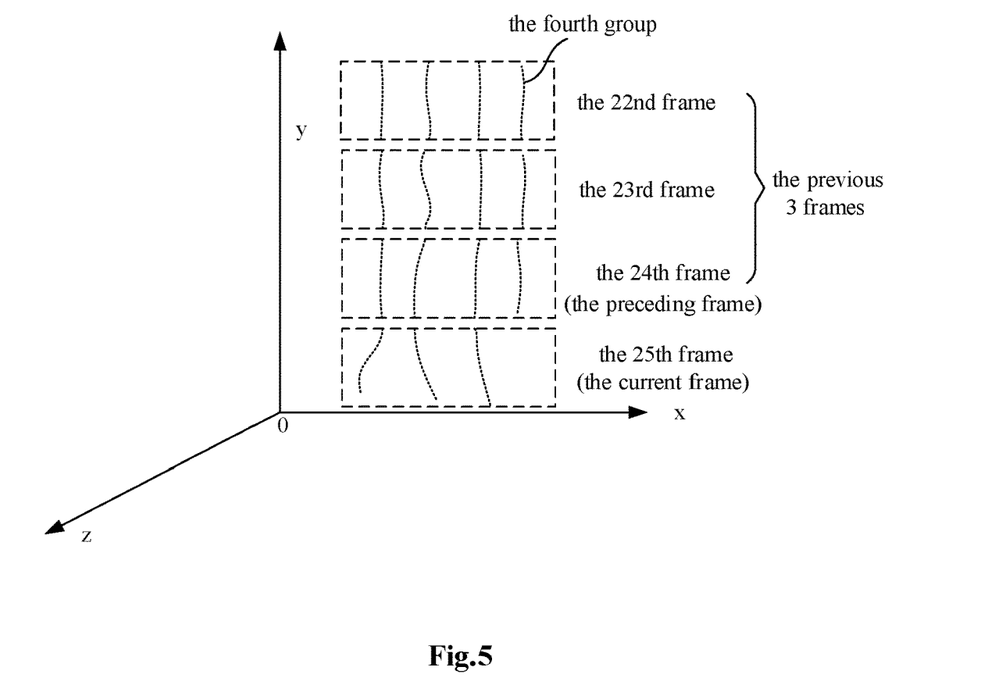
FIG. 5 and FIG. 6 are schematic diagrams illustrating a complementation and a deletion in a lane line tracking method according to embodiments of the present disclosure.
Figure 6:
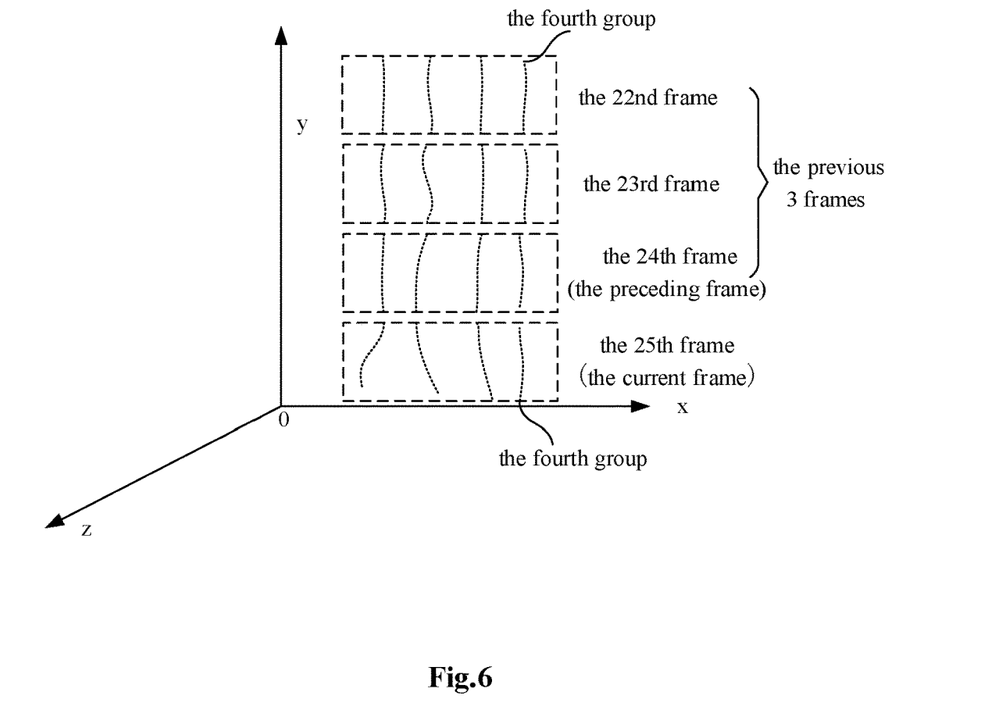

For example, as shown in FIG. 5 and FIG. 6, each of the previous K frames includes 4 groups, and the current frame includes 3 groups. As shown in FIG. 5, the current frame does not include any group corresponding to the fourth group of the previous K frames is determined according to the foregoing. That is, there is no group in the current frame whose distance from the fourth group of the previous K frames is less than a set threshold. In this case, as shown in FIG. 6, it is possible to complement the fourth group of the current frame by using the fourth group of any one of the previous K frames, e.g., the preceding frame (see the 24th frame in FIG. 6).

In an implementation, as shown in FIG. 4, the method further includes:

step S16: deleting the N-th lane line group in the second projection result of the previous K frames, if the second projection result of the previous K frames includes the N-th lane line group and consecutive T frames succeeding the current frame does not include a group corresponding to the N-th lane line group, where T is a positive integer greater than 1, and N is a positive integer greater than or equal to 1. This step may be executed after step S13 or after step S14. The deletion of a group is determined according to data smoothened by a smoothing-process.

For example, as shown in FIG. 6, it is assumed that the threshold T for the deletion of the group is 2, and the current frame is the (i−1)-th frame. None of the lane line groups of the i-th frame is merged into the fourth group of the previous K frames preceding the i-th frame, and none of the lane line groups of the (i+1)-th frame is merged into the fourth group of the previous K frames preceding the (i+1)-th frame. In this case, the N-th group can be subsequently deleted, for example, after the (i+1)-th frame. After the deletion, the N-th group is no longer compared with the groups of subsequent frames.

Regarding consecutive frames, there is a correlation between lane line information of a preceding frame and that of a succeeding frame. In some embodiments of the present disclosure, by using the correlation between a preceding frame and a succeeding frame, the following can be considered according to a preceding frame, for example: a determination of groups of a succeeding frame, a merging of groups of a succeeding frame with groups of a preceding frame, an establishment of a new group, or a deletion of a group. Therefore, it is possible to output more accurate and more robust lane line results, thereby achieving an accurate lane line tracking effect.

In addition, it is also possible to perform a smoothing-process, a filtering-process, a complementation and the like on lane line points of a succeeding frame according to a preceding frame. The use of the correlation between a preceding frame and a succeeding frame is conductive to an improvement of the smoothness and integrity of lane line detection results.

Figure 7:
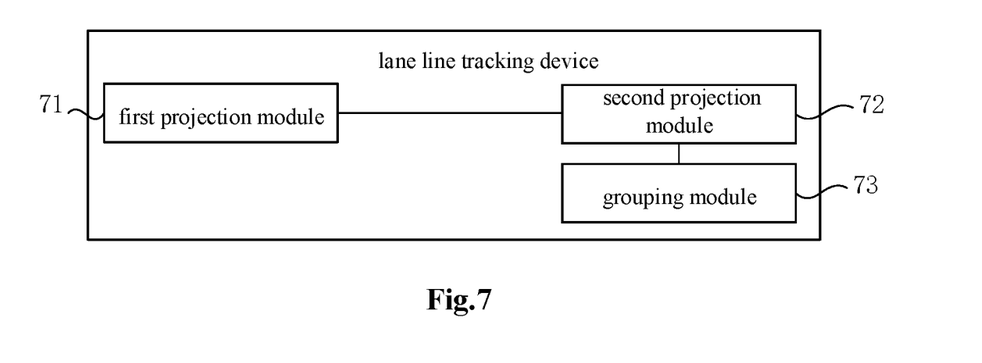
FIG. 7 is a block diagram showing a structure of a lane line tracking device according to an embodiment of the present disclosure.

FIG. 7 is a block diagram showing a structure of a lane line tracking device according to an embodiment of the present disclosure. As shown in FIG. 7, the device may include:

a first projection module 71, configured to project a lane line detection result of previous K frames preceding a current frame in a camera coordinate system to a world coordinate system, to obtain a first projection result, wherein K is a positive integer greater than or equal to 1, and the previous K frames are consecutive K frames preceding the current frame;

a second projection module 72, configured to project the first projection result of the previous K frames in the world coordinate system to a camera coordinate system of the current frame, to obtain a second projection result; and a grouping module 73, configured to determine, in the camera coordinate system of the current frame, lane line groups of the current frame, according to lane line groups in the second projection result of the previous K frames.

Figure 8:
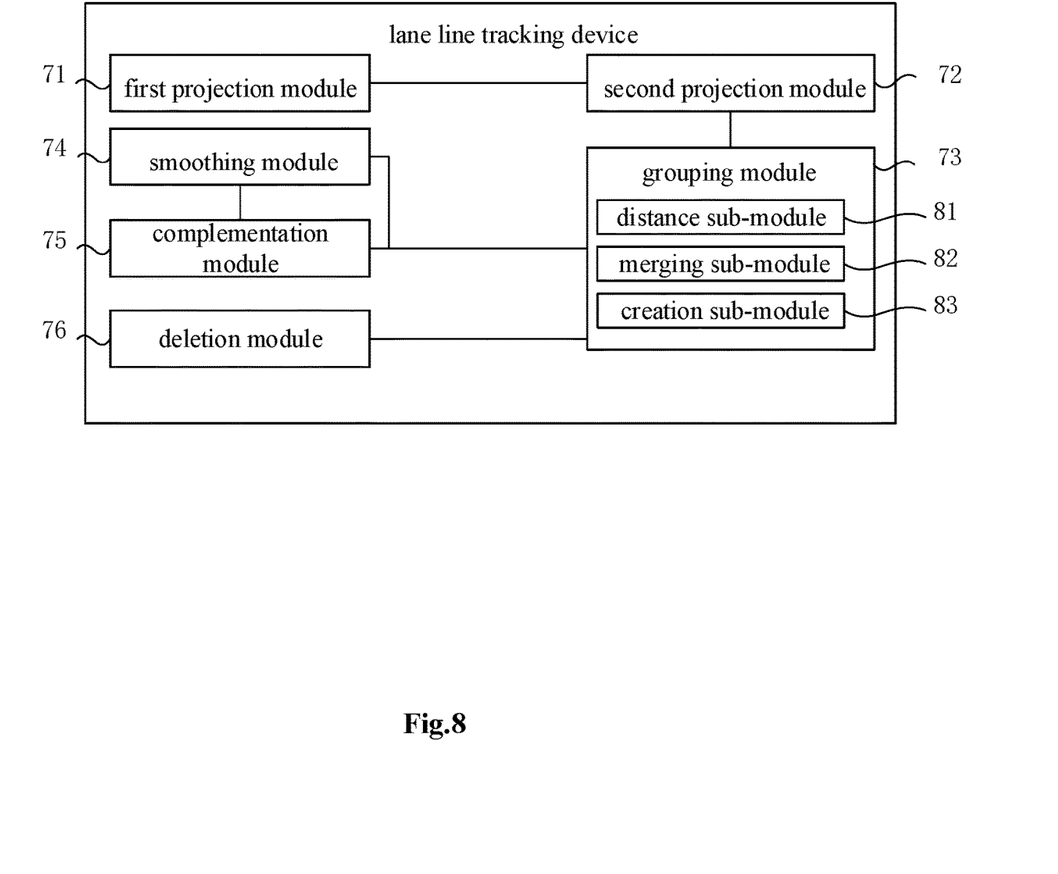
FIG. 8 is a block diagram showing a structure of a lane line tracking device according to an embodiment of the present disclosure.

In an implementation, as shown in FIG. 8, the grouping module 73 includes:

a distance sub-module 81, configured to select a lane line group from the current frame, and calculate minimum distances between the selected lane line group of the current frame and respective lane line groups in the second projection result of the previous K frames; and a merging sub-module 82, configured to merge the selected lane line group of the current frame into the S-th lane line group in the second projection result of the previous K frames, if a minimum distance between the selected lane line group and the S-th lane line group in the second projection result of the previous K frames has a minimum of the minimum distances, wherein S is a positive integer greater than or equal to 1.

In an implementation, the merging sub-module 82 is further configured to merge the selected lane line group of the current frame into the S-th lane line group in the second projection result of the previous K frames, if the minimum of the minimum distances is less than a preset threshold.

The grouping module further includes a creation sub-module 83 configured to establish a new group based on the selected lane line group of the current frame, if the minimum of the minimum distances is greater than or equal to the preset threshold.

According to an implementation, the device further includes:

a smoothing module 74, configured to perform, in the camera coordinate system of the current frame, a smoothing-process on the lane line points of the lane line groups of the current frame, according to lane line points of the lane line groups in the second projection result of the previous K frames.

According to an implementation, the smoothing module 74 is further configured to filter out a lane line point of the P-th lane line group of the current frame, if a distance between the lane line point of the P-th lane line group of the current frame and the P-th lane line group of the preceding frame are greater than a threshold, wherein P is a positive integer greater than or equal to 1.

According to an implementation, the device further includes:

a complementation module 75, configured to complement the current frame by using lane line points of the lane line groups in the second projection result of the previous K frames.

In an implementation, the complementation module 75 is further configured to add, in the current frame, lane line points of the M-th lane line group of the current frame by using lane line points of the M-th lane line group in the second projection result of the previous K frames, if the second projection result of the previous K frames includes the M-th lane line group and the current frame does not include a group corresponding to the M-th lane line group, wherein M is a positive integer greater than or equal to 1.

In an implementation, the device further includes:

a deletion module 76, configured to delete the N-th lane line group in the second projection result of the previous K frames, if the second projection result of the previous K frames includes the N-th lane line group and consecutive T frames succeeding the current frame does not include a group corresponding to the N-th lane line group, wherein T is a positive integer greater than 1, and N is a positive integer greater than or equal to 1.

The functions of various modules in the devices according to embodiments of the present disclosure may refer to the corresponding description of the above described method, and a repeated description is not given herein.

Figure 9:
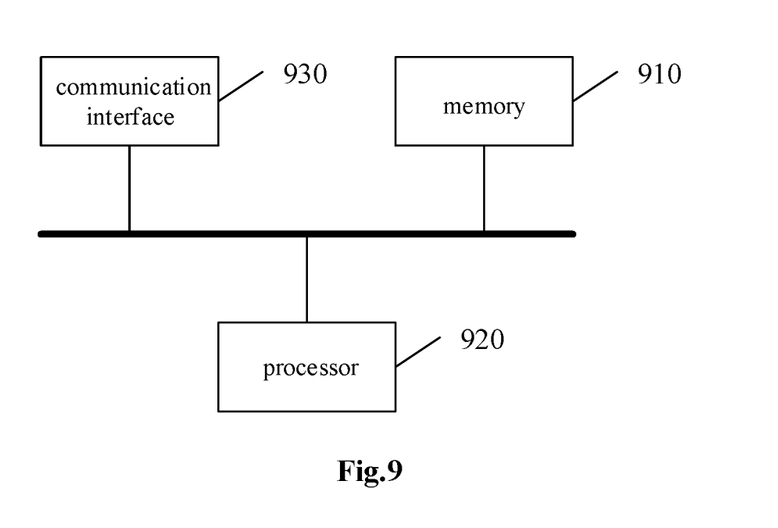
FIG. 9 is a block diagram showing a structure of a lane line tracking device according to an embodiment of the present disclosure.

FIG. 9 is a block diagram showing a structure of a lane line tracking device according to an embodiment of the present disclosure. As shown in FIG. 9, the device includes a camera configured to capture images, a memory 910 and a processor 920, wherein a computer program that can run on the processor 920 is stored in the memory 910. The processor 920 executes the computer program to implement the lane line tracking method according to the above embodiments. The number of the memory 910 and the processor 920 may each be one or more;

The device further includes:

a communication interface 930, configured to communicate with an external device to perform data interaction and transmission.

The memory 910 may include a high-speed RAM memory, or may also include a non-volatile memory, such as at least one disk memory.

If the memory 910, the processor 920 and the communication interface 930 are implemented independently, the memory 910, the processor 920 and the communication interface 930 may be connected to one another via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus or the like. For ease of illustration, only one bold line is shown in FIG. 9 to represent the bus, but it does not mean that there is only one bus or only one type of bus.

Optionally, in a specific implementation, if the memory 910, the processor 920 and the communication interface 930 are integrated on one chip, then the memory 910, the processor 920 and the communication interface 930 can complete mutual communication through an internal interface.

An embodiment of the present disclosure provides a non-volatile computer readable storage medium having a computer program stored thereon which, when executed by a processor, implements the method described in any of the above embodiments.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the present disclosure. Moreover, the specific features, structures, materials, or characteristics described may be combined in a suitable manner in any one or more of the embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of some embodiments of the present disclosure, the meaning of "a plurality" is two or more than two, unless otherwise explicitly or specifically indicated.

Any process or method described in the flowcharts or described otherwise herein may be construed as representing a module, segment or portion including codes for executing one or more executable instructions for implementing particular logical functions or process steps. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowcharts or otherwise described herein for example may be considered as an ordered list of executable instructions for implementing logical functions. They can be specifically embodied in any computer readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer readable medium" can be any means that can contain, store, communicate, propagate or transmit programs for use by an instruction execution system, apparatus or device or for use in conjunction with the instruction execution system, apparatus or device. More specific examples (non-exhaustive list) of computer readable storage medium at least include: electrical connection parts (electronic devices) having one or more wires, portable computer disk cartridges (magnetic devices), random access memory (RAM), read only memory (ROM), erasable programmable read-only memory (EPROM or flash memory), fiber optic devices, and portable read only memory (CDROM). In addition, the computer-readable storage medium may even be a paper or other suitable medium on which the programs can be printed. This is because for example the paper or other medium can be optically scanned, followed by editing, interpretation or, if necessary, other suitable ways of processing so as to obtain the programs electronically, which are then stored in a computer memory.

It should be understood that individual portions of some embodiments of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or part of the steps carried in the method of the foregoing embodiments may be implemented by using a program to instruct the relevant hardware, and the program may be stored in a non-volatile computer readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a non-volatile computer readable storage medium if it is implemented in the form of a software function module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be determined by the scope of the appended claims.

What is claimed is:

1. A lane line tracking method, comprising:
projecting a lane line detection result of previous K frames preceding a current frame in a camera coordinate system to a world coordinate system, to obtain a first projection result, wherein K is a positive integer greater than or equal to 1, and the previous K frames are consecutive K frames preceding the current frame;

projecting the first projection result of the previous K frames in the world coordinate system to a camera coordinate system of the current frame, to obtain a second projection result; and determining, in the camera coordinate system of the current frame, lane line groups of the current frame, according to lane line groups in the second projection result of the previous K frames.

2. The lane line tracking method of claim 1, wherein the determining, in the camera coordinate system of the current frame, lane line groups of the current frame, according to lane line groups in the second projection result of the previous K frames comprises:

selecting a lane line group from the current frame, and calculating minimum distances between the selected lane line group of the current frame and respective lane line groups in the second projection result of the previous K frames; and merging the selected lane line group of the current frame into an S-th lane line group in the second projection result of the previous K frames, if a minimum distance between the selected lane line group and the S-th lane line group in the second projection result of the previous K frames has a minimum of the minimum distances, wherein S is a positive integer greater than or equal to 1.

3. The lane line tracking method of claim 2, wherein the merging the selected lane line group of the current frame into the S-th lane line group in the second projection result of the previous K frames comprises:

merging the selected lane line group of the current frame into the S-th lane line group in the second projection result of the previous K frames, if the minimum of the minimum distances is less than a preset threshold; and establishing a new group based on the selected lane line group of the current frame, if the minimum of the minimum distances is greater than or equal to the preset threshold.

4. The lane line tracking method of claim 1, further comprising:

performing, in the camera coordinate system of the current frame, a smoothing-process on lane line points of the lane line groups of the current frame, according to lane line points of the lane line groups in the second projection result of the previous K frames.

5. The lane line tracking method of claim 4, wherein the performing a smoothing-process on lane line points of the lane line groups of the current frame, according to lane line points of the lane line groups in the second projection result of the previous K frames comprises:

filtering out a lane line point of a P-th lane line group of the current frame, if a distance between the lane line point of the P-th lane line group of the current frame and the P-th lane line group of the preceding frame are greater than a threshold, wherein P is a positive integer greater than or equal to 1.

6. The lane line tracking method of claim 1, further comprising:

complementing the current frame by using lane line points of the lane line groups in the second projection result of the previous K frames.

7. The lane line tracking method of claim 6, wherein the complementing the current frame by using lane line points of the lane line groups in the second projection result of the previous K frames comprises:

adding, in the current frame, lane line points of an M-th lane line group of the current frame by using lane line points of the M-th lane line group in the second projection result of the previous K frames, if the second projection result of the previous K frames comprises the M-th lane line group and the current frame does not comprise a group corresponding to the M-th lane line group, wherein M is a positive integer greater than or equal to 1.

8. The lane line tracking method of claim 1, further comprising:

deleting an N-th lane line group in the second projection result of the previous K frames, if the second projection result of the previous K frames comprises the N-th lane line group and consecutive T frames succeeding the current frame does not comprise a group corresponding to the N-th lane line group, wherein T is a positive integer greater than 1, and N is a positive integer greater than or equal to 1.

9. A lane line tracking device, comprising:

one or more processors;

a storage device for storing one or more programs;

a camera for capturing images; wherein the one or more programs are executed by the one or more processors to enable the one of more processors to implement a method comprising:

projecting a lane line detection result of previous K frames preceding a current frame in a camera coordinate system to a world coordinate system, to obtain a first projection result, wherein K is a positive integer greater than or equal to 1, and the previous K frames are consecutive K frames preceding the current frame;

projecting the first projection result of the previous K frames in the world coordinate system to a camera coordinate system of the current frame, to obtain a second projection result; and determining, in the camera coordinate system of the current frame, lane line groups of the current frame, according to lane line groups in the second projection result of the previous K frames.

10. The lane line tracking device of claim 9, wherein the one or more programs are executed by the one or more processors to enable the one or more processors to implement the method further comprising:

selecting a lane line group from the current frame, and calculate minimum distances between the selected lane line group of the current frame and respective lane line groups in the second projection result of the previous K frames; and merging the selected lane line group of the current frame into an S-th lane line group in the second projection result of the previous K frames, if a minimum distance between the selected lane line group and the S-th lane line group in the second projection result of the previous K frames has a minimum of the minimum distances, wherein S is a positive integer greater than or equal to 1.

11. The lane line tracking device of claim 10, wherein the one or more programs are executed by the one or more processors to enable the one or more process to implement the method further comprising:

merging the selected lane line group of the current frame into the S-th lane line group in the second projection result of the previous K frames, if the minimum of the minimum distances is less than a preset threshold; and establishing a new group based on the selected lane line group of the current frame, if the minimum of the minimum distances is greater than or equal to the preset threshold.

12. The lane line tracking device of claim 10, wherein the one or more programs are executed by the one or more processors to enable the one or more process to implement the method further comprising:

performing, in the camera coordinate system of the current frame, a smoothing-process on lane line points of the lane line groups of the current frame, according to lane line points of the lane line groups in the second projection result of the previous K frames.

13. The device of claim 12, wherein the one or more programs are executed by the one or more processors to enable the one or more process to implement the method further comprising:

filtering out a lane line point of a P-th lane line group of the current frame, if a distance between the lane line point of the P-th lane line group of the current frame and the P-th lane line group of the preceding frame are greater than a threshold, wherein P is a positive integer greater than or equal to 1.

14. The lane line tracking device of claim 9, wherein the one or more programs are executed by the one or more processors to enable the one or more process to implement the method further comprising:

complementing the current frame by using lane line points of the lane line groups in the second projection result of the previous K frames.

15. The lane line tracking device of claim 14, wherein the one or more programs are executed by the one or more processors to enable the one or more process to implement the method further comprising:

adding, in the current frame, lane line points of an M-th lane line group of the current frame by using lane line points of the M-th lane line group in the second projection result of the previous K frames, if the second projection result of the previous K frames comprises the M-th lane line group and the current frame does not comprise a group corresponding to the M-th lane line group, wherein M is a positive integer greater than or equal to 1.

16. The lane line tracking device of claim 9, wherein the one or more programs are executed by the one or more processors to enable the one or more process to implement the method further comprising:

deleting an N-th lane line group in the second projection result of the previous K frames, if the second projection result of the previous K frames comprises the N-th lane line group and consecutive T frames succeeding the current frame does not comprise a group corresponding to the N-th lane line group, wherein T is a positive integer greater than 1, and N is a positive integer greater than or equal to 1.

17. A non-transitory computer readable storage medium having computer programs stored thereon, wherein the programs, when executed by a processor, cause the processor to implement the method of claim 1.

* * * * *

UNITED STATES PATENT AND TRADEMARK OFFICE
CERTIFICATE OF CORRECTION

PATENT NO. : 11,100,341 B2  
APPLICATION NO. : 16/509112  
DATED : August 24, 2021  
INVENTOR(S) : Shufu Xie et al.

Page 1 of 1

It is certified that error appears in the above-identified patent and that said Letters Patent is hereby corrected as shown below:

On the Title Page

Column 1, Item (30), Line 1, under Foreign Application Priority Data, delete "20181102606.X" and insert --201811026061.X--.

In the Specification

In Column 7, Line 55, delete "Step" and insert --step--.

In Column 12, Lines 7-8, delete "portable read only memory (CDROM)." and insert --portable compact disc read only memory (CD-ROM).--.

In the Claims

In Column 15, Claim 13, Line 10 (Approx.), delete "device" and insert --lane Line tracking device--.

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*